(12) United States Patent
Koini et al.

(10) Patent No.: US 6,588,574 B2
(45) Date of Patent: Jul. 8, 2003

(54) METHOD AND APPARATUS FOR AUTOMATICALLY LOADING AND UNLOADING PIECE GOODS

(75) Inventors: Martin Koini, Sörth (DE); Günther Nagel, Graben-Neudorf (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/833,350

(22) Filed: Apr. 12, 2001

(65) Prior Publication Data

US 2001/0050213 A1 Dec. 13, 2001

(30) Foreign Application Priority Data

Apr. 13, 2000 (DE) .......................... 100 18 385

(51) Int. Cl.[7] .............................................. B65G 43/00
(52) U.S. Cl. ...................... 198/341.01; 901/7; 901/47
(58) Field of Search ........................ 198/339.1, 341.01, 198/341.02, 341.03; 901/7, 47

(56) References Cited

U.S. PATENT DOCUMENTS

| | | | | |
|---|---|---|---|---|
| 4,287,459 A | * | 9/1981 | Dahlstrom ................. | 901/7 X |
| 4,402,053 A | * | 8/1983 | Kelley et al. .............. | 901/47 X |
| 4,641,271 A | * | 2/1987 | Konishi et al. ............. | 901/7 X |
| 4,777,608 A | * | 10/1988 | Hashimoto et al. ......... | 901/7 X |
| 4,942,539 A | * | 7/1990 | McGee et al. ............ | 901/47 X |
| 5,299,693 A | * | 4/1994 | Ubaldi et al. ................ | 901/7 X |
| 5,969,339 A | * | 10/1999 | McMurray et al. ......... | 901/7 X |

* cited by examiner

*Primary Examiner*—James R. Bidwell
(74) *Attorney, Agent, or Firm*—Laurence A. Greenberg; Werner H. Stemer; Ralph E. Locher

(57) ABSTRACT

A method and an apparatus for automatically loading and unloading piece goods of different shapes, consistencies and masses in a permanently installed conveying system. The relevant piece goods are picked up automatically by a remote controlled apparatus, by the piece goods being gripped by friction by the apparatus and moved onto a pick-up platform belonging to the apparatus. Moreover, the piece goods, after being picked up on the pick-up platform, are secured by force and/or shape against slipping off or falling down until they are unloaded, and the loaded goods being put down automatically by the apparatus at the intended location.

18 Claims, 1 Drawing Sheet

METHOD AND APPARATUS FOR AUTOMATICALLY LOADING AND UNLOADING PIECE GOODS

BACKGROUND OF THE INVENTION

1. Field of the Invention

The invention relates to a method and an apparatus for automatically loading and unloading pieces goods of different shapes, dimensions, consistency and mass in a permanently installed conveying system.

Apparatus for picking up conveyed goods from permanently installed conveying devices are known as robots. Likewise, it is also known per se to deposit or to stack or store the conveyed goods at a position in the range of action of the robot.

For this purpose, on a freely moveable end of an arm belonging to the relevant robot, a corresponding pick-up device is fitted, for example a gripper. The pick-up device permits the conveyed goods to be picked up securely and reliably at their pick-up position and to be deposited again after being conveyed to their final position. For industrial applications, a very wide range of principles and embodiments for these pick-up devices are known. Inter alia, the following pick-up mechanisms are known. Mechanical gripping devices, which engage around the conveyed material, are used for example when loading sack-like conveyed goods. Vacuum grippers, that pick up the conveyed goods by suction, are used for example when loading conveyed goods similar to packages. Electromagnetic grippers for loading metallic conveyed goods are known.

The known load pick-up devices for robots all have the disadvantage that their respective pick-up principle is suitable only for a restricted bandwidth of conveyed goods. Therefore, in terms of their industrial application, these pick-up devices are restricted to specific conveyed goods. In particular, they cannot be employed in applications in which a large variety of conveyed goods have to be picked up and conveyed with the aid of the same pick-up device.

In addition, most of the known devices have the disadvantage that the conveyed material have to be enclosed by the pick-up device or covered from the side or from above in another form. This impairs the deposition of the conveyed goods to the extent that, for this purpose, corresponding movement clearances have to be reserved in the deposition area since, otherwise, the trouble-free removal and deposition are not ensured. If such clearances are not possible, depending on the location or the application, the corresponding pick-up mechanisms cannot be employed.

A prominent exemplary application, in which the disadvantages of the pick-up devices known nowadays come clearly to light, is the robot-assisted loading of pieces of baggage in airfreight containers. In this application it has to be possible to pick up securely a great physical variety of pieces of baggage, that is to say conveyed goods of different dimensions, consistency and mass.

In addition, these pieces of baggage have to be conveyed in a container that is accessible only from the side and have to be deposited there. Because of the movement space, which is severely restricted by the container walls and by pieces of baggage already present, of the robot with its pick-up device, pick-up devices known nowadays and belonging to the types previously described cannot be employed here.

SUMMARY OF THE INVENTION

It is accordingly an object of the invention to provide a method and an apparatus for automatically loading and unloading piece goods which overcome the above-mentioned disadvantages of the prior art devices and methods of this general type, such that the automatic loading and unloading of conveyed goods is now possible, irrespective of the shape, the dimensions, the consistency and the mass. In addition, the intention is to ensure that the conveyed goods are deposited at their target location in such a way that the apparatus itself reaches into the deposition area as little as possible.

With the foregoing and other objects in view there is provided, in accordance with the invention, a method for automatically loading and unloading piece goods of different shapes, consistencies and masses to/from a permanently installed conveying system. The method includes providing a remote controlled apparatus for automatically picking up the piece goods. The piece goods are gripped by friction by the remote controlled apparatus and are moved onto a pick-up platform of the remote controlled apparatus. The piece goods, after being picked up on the pick-up platform, are secured by force and/or shape against slipping off and falling down until the piece goods are unloaded. The piece goods are put down automatically by the remote controlled apparatus at an intended location.

According to the invention, the relevant piece goods are picked up automatically by a remote-controlled apparatus, by the piece goods being gripped by friction by the apparatus and moved onto a pick-up platform belonging to the apparatus. The piece goods, after being picked up on the pick-up platform, are then secured by force and/or shape against sliding off or falling down until they are unloaded, and are set down automatically by the apparatus at the intended location.

The loaded goods located on the relevant pick-up platform are advantageously secured by associated lateral bounding device(s), it being possible, in a further refinement of the invention, for the bounding devices to be adjusted to the relevant loaded goods.

An apparatus according to the invention for implementing the method previously described has, a robot with a carrying arm that can be moved along several axes and is formed from at least two-part arms. Disposed at the free end of the carrying arm is a conveyed-goods pick-up according to the invention, which has a pick-up platform which has a conveyor belt and is enclosed by a side wall on at least each of the two sides running transversely with respect to the conveying direction of the conveyor belt.

Described in simple terms, the apparatus according to the invention, which is fitted to the robot arm, is configured to be similar to a shovel, but the thrust movement usual in the case of a shovel to pick up the relevant conveyed goods does not occur here. Instead, the movement of the conveyor belt has the effect that the relevant conveyed goods to be picked up are continuously moved onto the pick-up platform, by the grippy conveyor belt gripping the conveyed material by friction and pulling it onto the pick-up platform until a limit switch or end stop provided there interrupts the conveying movement of the conveyor belt.

The invention therefore describes a device fixed to the robot arm to pick up conveyed goods. With the aid of this device, which is a translational conveyed-goods pick-up, conveyed goods can be picked up from permanently installed conveying devices, such as belt conveyors, and, using the robot, can be conveyed into a position located in the active range of the latter and deposited there.

A preferred area of use of the present invention is the loading and unloading of airfreight goods. The apparatus according to the invention is used in this case to pick up passenger baggage during the robot assisted loading of the baggage into-airfreight containers. However, the configuration described below is not restricted to this application but, if necessary with relatively small adaptations, can also be used for other loading processes.

According to a preferred embodiment of the invention, the conveyor belt is driven bidirectionally, an electric shaft motor preferably integrated into a deflection roller for the conveyor belt, which is constructed as an endless belt, being used as a drive.

In this case, it proves to be beneficial for the deflection rollers for the conveyor belt provided on the pick-up platform to have a diameter between 8% and 15% of the width of the conveyor belt, preferably 10%.

The conveyor belt is advantageously formed by a conveying belt whose surface has profiling which preferably runs transversely with respect to the conveying direction of the conveyor belt. Instead, for the purpose of improving the grippiness, the surface can also be provided with bumps, in order by this to effect the gripping of the relevant conveyed goods more reliably.

A further advantageous development of the invention provides for the conveyor belt to have, in each direction, a limit switch or end stop, which stops the forward and reverse run of the conveyor belt, respectively, as soon as the relevant conveyed goods have reached their final position on the pick-up platform or, respectively, left it.

The conveyor belt expediently has a thickness of at least 1 mm plus the profile height, so that the conveyor belt is also suitable for a small deflection radii.

With a view to simultaneously easy handling and a wide range of applications of the conveyed-goods pick-up, the length of the conveyor belt is at least 1.3 times its width, preferably 450 mm.

In order to secure the conveyed goods located on the pick-up platform adequately, the lateral side walls enclosing the pick-up platform are disposed such that they can be moved and, consequently, can be adapted to the dimension of the relevant conveyed goods.

In addition, the conveyed-goods pick-up according to the invention can be provided with at least one proximity sensor, which is expediently disposed on the pick-up platform and cooperates with a control device which, moreover, also performs the control of the basic appliance, that is to say the robot. As a supplement to this, a video monitoring system can also be provided, which monitors the operating sequence of the apparatus and co-operates with the control device.

According to a further advantageous refinement of the invention, the conveyed-goods pick-up according to the invention is disposed in an automatic conveying system for piece goods and performs the automatic loading and unloading of conveyed goods of different shapes, consistencies and mass into and from baggage trolleys which, for this purpose, are provided next to the conveying system.

Other features which are considered as characteristic for the invention are set forth in the appended claims.

Although the invention is illustrated and described herein as embodied in a method and an apparatus for automatically loading and unloading piece goods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
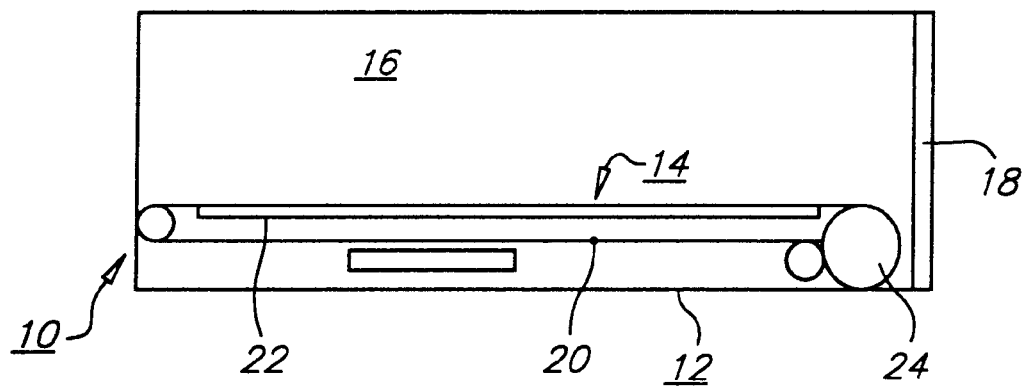
FIG. 1 is a diagrammatic, longitudinal sectional view through an apparatus according to the invention.
Figure 2:
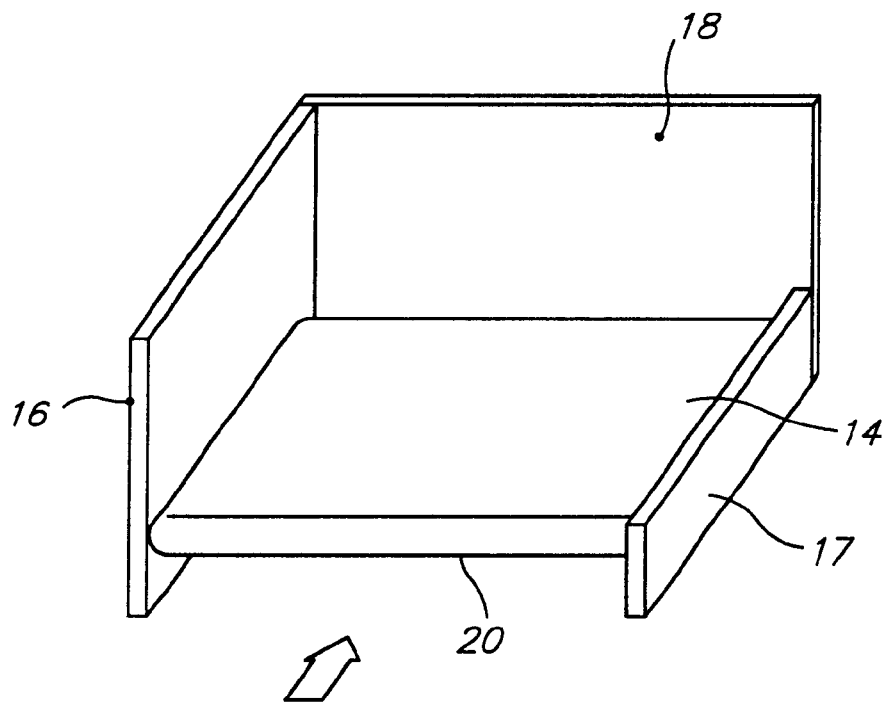
FIG. 2 is a perspective view of the apparatus according to FIG. 1.

In all the figures of the drawing, sub-features and integral parts that correspond to one another bear the same reference symbol in each case. Referring now to the figures of the drawing in detail and first, particularly, to FIG. 1 thereof, there is shown a translational conveyed-goods pick-up 10 according to the invention that has a housing 12 which is open at the top and has a floor 14. At a side and rear, the housing 12 is in each case bounded by a wall 16, 17, 18, of which in FIG. 1 only one side wall 16 is shown in elevation and a rear wall 18 in cross section.

The floor 14 is formed by a conveying belt 20, which is supported on a platform 22 and is acted on bidirectionally by an axial motor 24. The conveying belt 20 is constructed as an endless belt and is guided over deflection rollers 26 and 28. The platform 22 is used for the deposition of the conveyed goods picked up on the conveying belt 20 and is formed by a deposition board disposed under the top of the conveyor belt 20.

The aforementioned side walls 16, 17 and the rear wall 18 are used to secure the conveyed goods picked up and are provided as guides 16, 17 located at the sides of the conveying belt 20 and, respectively, as a stop 18. In different embodiments, these can also be configured such that they can folded or lowered or displaced, in order in this way to configure the conveyed-goods pick-up and deposition to be more advantageous in application.

The rear wall 18 of the pick-up 10 is used both to secure a piece of baggage against slipping off or falling off and also for fixing the apparatus according to the invention to a robot arm. Likewise, the necessary signal and supply lines for driving and controlling the axial motor 24 are led via the rear wall 18.

The conveyor belt 20 has a surface with a profiling 32 (shown exaggerated in FIG. 1) running transversely with respect to a conveying direction of the conveyor belt 20. The conveyor belt 20 has a thickness of at least 1 mm and the profiling 32 has a profile height extending above the thickness of the conveyor belt.

At least one proximity sensor 34 and a control device 36 connected to the proximity sensor 34 is provided. The proximity sensor(s) 34 monitors the goods on the conveyor belt 20 and provides feedback to the control device 36. In addition to or in place of the proximity sensor 34, a video monitoring system 38 for monitoring an operating sequence of the conveyed-goods pick-up 10 is provided and is connected to the control device 36.

In the application, using the translational conveyed goods pick-up 10 described, the following functional sequence results.

The translational conveyed-goods pick-up 10 is positioned by the robot arm in the conveying path of conveying sections present in a known way for the baggage or freight in such a way that it arrives at the series connection between two belt conveyors, not shown here but following each other, or at the end of a conveying section. By a higher-order control system, the belt conveyor is started, while at the same time the control system gives the conveying mechanism the command to move the conveyed goods onwards.

As a result of the synchronized conveying movement, the conveyed goods pass onto the conveying belt 20 of the translational conveyed-goods pick-up 10. After reaching the final position there, the conveying movement is stopped by being switched off by an integrated limit switch 30.

The conveyed goods picked up in this way are then positioned by the robot arm at their target location. By synchronizing the outward conveying movement of the conveying belt 20 of the translational conveyed-goods pick-up 10, with the moving robot arm, the conveyed goods are caused to remain relatively static at their target location.

Using the method described in this way, it is therefore possible to pick up all conveyed goods which can be transported by belt conveyors, irrespective of their surface, consistency, weight and shape. By synchronizing the conveying speed of the permanently installed belt conveyors with the conveyor belt 20 of the translational conveyed-goods pick-up 10, it is ensured that during the transfer from the conveying section to the pick-up 10, no conveying problems occur which, for example, could be produced by conveyed goods building up or tilting or being displaced.

With the aid of the side and rear guides and stops 16, 17, 18 it is also ensured that the conveyed goods remain on the pick-up 10 while being positioned by the robot. This permits a robot movement having a large number of axes, including tilting the pick-up apparatus 10 in order to protect the conveyed item slipping in the longitudinal direction of the conveyor belt 20.

The synchronization of the movement of the conveyor belt 20 with the movement of the robot arm during the deposition of the conveyed goods permits exact positioning of the conveyed goods at their target location, specifically in applications such as the above-described loading of baggage, the positioning also being maintained during the offloading process itself. In addition, during deposition, only a small amount of additional clearance is needed at the target location, since the robot and the pick-up apparatus are positioned substantially only to the side and outside the deposition area, and only the conveyor belt 20 with its side fittings 16 and 17 project into the target area.

We claim:

1. A method for automatically loading and unloading piece goods of different shapes, consistencies and masses to/from a permanently installed conveying system, which comprises the steps of:
   providing a-remote-controlled conveyed-goods pick-up device for automatically picking up the piece goods, the remote-controlled conveyed-goods pick-up device having a pick-up platform with a conveyor belt and side walls;
   positioning the remote-controlled conveyed-goods pick-up device in a conveying path of the conveying system by a robot;
   moving the piece goods from the conveying system onto a pick-up platform of the remote-controlled conveyed-goods pick-up device by friction;
   securing the piece goods, after being picked up on the pick-up platform, by at least one of force and shape against slipping off and falling down until unloading the piece goods; and
   putting down automatically the piece goods by the remote-controlled conveyed-goods pick-up device at an intended location.

2. The method according to claim 1, which comprises securing the pieces goods loaded on the pick-up platform to the pick-up platform by associated lateral bounding devices.

3. The method according to claim 1, which comprises securing the piece goods loaded on the pickup platform to the pick-up platform by an adjustable lateral bounding device.

4. An apparatus for automatically loading and unloading piece goods of different shapes, consistencies and masses to/from a permanently installed conveying system, comprising:
   a robot having a carrying arm to be moved along several axes and being formed from at least two parts and having a free end; and
   a remote-controlled conveyed-goods pick-up device disposed at said free end of said carrying arm for automatically picking up the piece goods, said remote controlled conveyed-goods pick-up device having a pick-up platform with a conveyor belt and side walls, said conveyor belt enclosed by said side walls on at least two sides running transversely with respect to a conveying direction of said conveyor belt.

5. The apparatus according to claim 4, wherein said conveyor belt is driven bidirectionally.

6. The apparatus according to claim 4, wherein said conveyor belt has a surface with profiling running transversely with respect to the conveying direction of said conveyor belt.

7. The apparatus according to claim 4, wherein said pick-up platform has deflection rollers deflecting said conveyor belt and said deflection rollers having a diameter between 8% and 15% of a width of said conveyor belt.

8. The apparatus according to claim 7, wherein said diameter of said deflection rollers is 10% of said width of said conveyor belt.

9. The apparatus according to claim 4, wherein said conveyor belt has one of a limit switch and an end stop in each direction.

10. The apparatus according to claim 6, wherein said conveyor belt has a thickness of at least 1 mm and said profiling has a profile height extending above said thickness of said conveyor belt.

11. The apparatus according to claim 4, wherein said conveyor belt has a width and a length of at least 1.3 times said width.

12. The apparatus according to claim 4, wherein said side walls enclosing said pick-up platform are disposed such that said side walls can be moved.

13. The apparatus according to claim 12, wherein a distance between said side walls enclosing said pick-up platform is adapted to a dimension of relevant conveyed goods.

14. The apparatus according to claim 4, including proximity sensors and a control device connected to said proximity sensors, said proximity sensors are associated with and monitor said pick-up platform.

15. The apparatus according to claim 14, including a video monitoring system for monitoring an operating sequence of said conveyed-goods pick-up and is connected to said control device.

16. The apparatus according to claim 4, wherein said conveyor belt is an endless belt.

17. The apparatus according to claim 4, wherein said conveyed-goods pick-up and said robot are to be disposed in an automatic conveying system for the piece goods, said conveyed-goods pickup performs an automatic loading and unloading of conveyed goods of different shapes, consistencies and masses into and from baggage trolleys which are disposed beside the automatic conveying system.

18. The apparatus according to claim 10, wherein said length is 450 mm.

* * * * *